United States Patent

Alofs et al.

[11] Patent Number: 5,825,481
[45] Date of Patent: Oct. 20, 1998

[54] OPTIC POSITION SENSOR

[75] Inventors: Cornell W. Alofs; Ronald R. Drenth, both of Petoskey, Mich.

[73] Assignee: Jervis B. Webb Company, Farmington Hills, Mich.

[21] Appl. No.: 857,898

[22] Filed: May 16, 1997

Related U.S. Application Data

[60] Provisional application No. 60/018,400, May 22, 1996.
[51] Int. Cl.$^6$ ..................................................... G01B 11/26
[52] U.S. Cl. ............................ 356/138; 356/141; 356/152
[58] Field of Search ................................ 356/237, 4, 138, 356/141, 152

[56] References Cited

U.S. PATENT DOCUMENTS

| | | |
|---|---|---|
| 4,865,443 | 9/1989 | Howe et al. ................................. 356/4 |
| 5,056,913 | 10/1991 | Tanaka et al. . |
| 5,131,740 | 7/1992 | Maekawa . |
| 5,196,689 | 3/1993 | Sugita et al. . |

Primary Examiner—Frank G. Font
Assistant Examiner—Reginald A. Ratliff
Attorney, Agent, or Firm—Dickinson Wright PLLC

[57] ABSTRACT

The present invention involves an apparatus and a method for optically detecting and determining the angular position of a target. The apparatus comprises a pair of optic sensors arranged so that at least a portion of their sensing areas overlap. Their overlapping areas define the total sensing, or active sensing, area for the apparatus. Each of the optic sensors in the apparatus senses light, or other optically sensible transmission, either projected or reflected from a target positioned within the total sensing area and produces a signal relative to the amount of light sensed. The signals are then interpreted to determine the angular position of the target based on the relative signals from the optic sensors. The method of the present invention determines the angular position of a target within an area, defined by the overlapping sensing areas of a pair of optic sensors, by interpreting the relative signal intensities from the pair of optic sensors. Once the angular position is determined, the distance of the target from a line either perpendicular to or parallel to the center line of the sensor array can be calculated if the other quantity is known.

20 Claims, 2 Drawing Sheets

OPTIC POSITION SENSOR

CROSS-REFERENCE TO RELATED APPLICATIONS

This application claims the benefit of U.S. Provisional application Ser. No. 60/018,400 filed May 22, 1996 which is herein incorporated by reference.

FIELD OF THE INVENTION

This invention relates to apparatus and method for optically sensing angular position of a target. More specifically, this invention relates to an apparatus and method for determining the trigonometric tangent of the lateral offset angle, with respect to the apparatus' centerline, to a light emitting or reflecting target.

BACKGROUND OF THE INVENTION

Displacement measurements are important in many manufacturing operations, especially those relying on feedback control. Optical sensors are particularly useful in industrial settings because they can make non-contact measurements and are relatively immune to electrical and magnetic interference.

Presently, many types of optic sensors exist for fixed equipment that will determine the presence of a target, i.e., object detection, or the in-line distance to a target, i.e., distance measurement. The following patents discuss some of these types of optic sensors.

U.S. Pat. No. 4,865,443 (Howe et al.) discusses an optical displacement sensor that uses the inverse-square attenuation of light reflected from a diffused surface to calculate the, essentially in-line, distance between the reflecting surface and the sensor. The sensor comprises two co-linearly mounted light sensors, arranged so that their ends are at different distances from the distant reflective target, and a laser or collimated light source. This sensor can only determine the distance when the target is positioned essentially in-line with the sensor.

U.S. Pat. No. 5,056,913 (Tanaka et al.) discusses an optic sensor using light sources adapted to have their optical characteristics varied as a function of their distance to the target. The distance is varied either by physically mounting the light sources at different locations or by manipulating the light beam from the light source with lens or dichroic mirrors. This sensor is only useful to determine in-line distances.

U.S. Pat. No. 5,196,689 (Sugita et al.) discusses an object detecting device wherein two or more light receivers are positioned so they partially overlap to form object detection areas. The conical shape of the light detection areas are divided into portions. Each portion represents an area where a different receiver or set of receivers detect light. The position of the object is determined by identifying in which portion, within the overall detection area, the object is located. This detecting device is only capable of establishing which area an object appears in and not any specific position within an area.

There is another type of optic sensor which is known to provide a variable signal output level indicating the percentage of a full reflector that is currently obstructed. This sensor has been used to monitor the effective center position of a target when the target's variable range is limited to one, or the other, of the edges of the sensor's sixty degree active forward viewing area. Such a single detector is very sensitive to changes in its light source and also provides very limited real linear positioning data. There are also moving or rotating laser scanners that optically measure the angle to a target. All of the optic sensors heretofore fail to measure the angle and/or lateral position of an optical target utilizing a fixed, or non-rotating, sensor assembly.

SUMMARY OF THE INVENTION

Therefore, it is an object of the present invention to provide an optic sensor that is capable of measuring the angular position of a target relative to the centerline of the optic sensor.

Another object of the present invention is to provide a optic sensor capable of determining the angular position of a target with a simplified assembly that does not demand high optical properties or mechanical precision.

A further object of the present invention is to provide an optic sensor capable of determining the angular position of a target that eliminates dependence on reflective properties and instantaneous illumination power of the target.

It is still a further object of the present invention to provide a method for determining the angle of a target relative to the centerline of the apparatus's sensing area and determining the distance of either the target from the centerline or from the sensor by knowing the other.

The present invention involves an apparatus and a method for optically detecting and determining the angular position of a target. The apparatus comprises a pair of optic sensors arranged so that at least a portion of their sensing areas overlap. Their overlapping areas define the total sensing, or active sensing, area for the apparatus. Each of the optic sensors in the apparatus senses light, or other optically sensible transmission, either projected or reflected from a target positioned within the total sensing area and produces a signal relative to the amount of light sensed. The signals are then interpreted to determine the angular position of the target based on the relative signals from the optic sensors.

The method of the present invention determines the angular position of a target within an area, defined by the overlapping sensing areas of a pair of optic sensors, by interpreting the relative signal intensities from the pair of optic sensors. Once the angular position is determined, the distance of the target from a line either perpendicular to or parallel to the center line of the sensor array can be calculated if the other quantity is known.

DETAILED DESCRIPTION OF THE INVENTION AND THE PREFERRED EMBODIMENTS THEREOF

Figure 1:
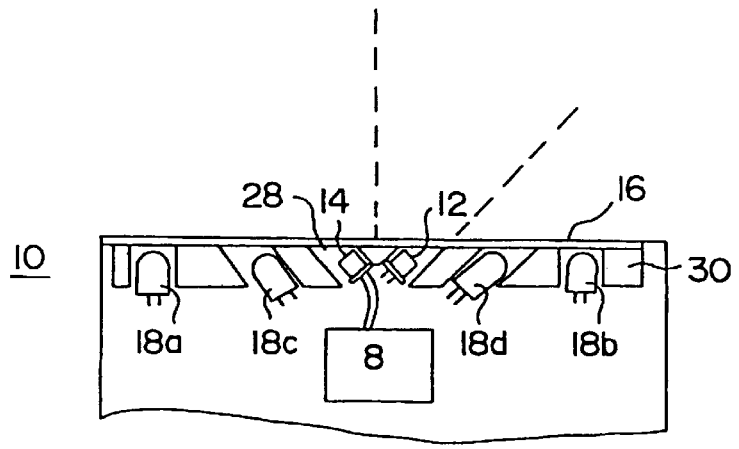
FIG. 1 is a plan view of an optic sensor assembly in accordance with the present invention.

FIG. 1 depicts an optic sensor apparatus 10 comprising a first optic sensor 12, a second optic sensor 14, a filter 16, a series of light emitters 18(a–d), and a processor 8. The first and second optic sensors 12 & 14 are infrared photodiodes but may be any optic sensing devices suitable for this purpose. Although the optic sensors may be of different designs, it is preferred that they have substantially the same sensitivities.

Figure 3:
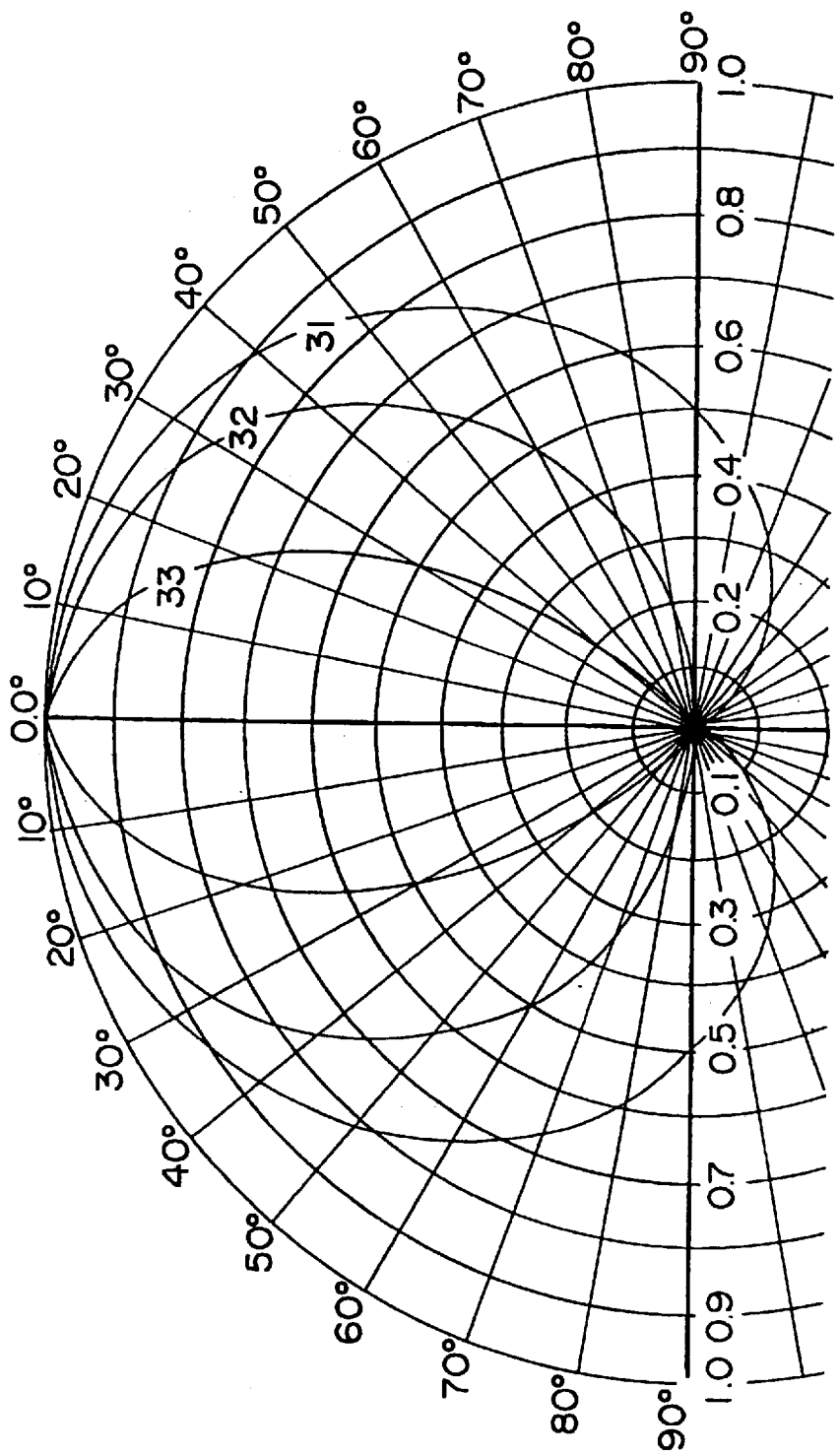
FIG. 3 is a diagram illustrative of two characteristic sensitivity curves and a perfectly circular sensitivity curve for optic sensors that may be employed in the optic sensor assembly of the present invention.

Each optic sensor 12 & 14 has a finite sensing area and a sensitivity which varies as a function of the angular direction of the sensed light. The sensitivity of a sensor can be characterized by the shape of the sensitivity curve as a function of angular displacement of the light source. Optic sensors having the characteristic rose petal or cardioid shaped sensitivity curves 31 & 33 (FIG. 3) are quite common and work well in the present invention. FIG. 3 depicts these characteristic sensitivity curves as well as a perfectly circular sensitivity curve 32.

The optic sensors 12 & 14 are positioned so that their sensing areas overlap. The overlapping area defines the total sensing area 22 for the apparatus, see FIG. 2. Since the intensity of projected light varies as a function of distance, the preferred arrangement is for the optic sensors 12 & 14 to be positioned immediately adjacent to each other so that they are equidistantly positioned from a target 20. In the preferred embodiment, the optic sensors are mounted adjacent to each other on opposite sides of the centerline 24 of the apparatus's total sensing area. Although the relative angular position of the optic sensors depends on their characteristic sensitivity curves and the specifics of the application, the preferred angle for the cardioid type optic sensors of the preferred embodiment is about 90° with each sensor preferably angled at about 45° outwardly from the centerline of the total sensing area of the apparatus, see FIG. 2. This preferred arrangement provides a total sensing area that extends 45° on either side of the centerline. With the centerline 26 (*a*&*b*) of each of the optic sensors, projecting outwardly at a 45° angle defining the 90° total sensing area 22.

The optic sensor apparatus may optionally be equipped with light emitters 18(*a–d*). The preferred light emitter is an infrared LED but may be any type of optically sensible emitter, including ultraviolet or visible light emitters. The light emitters are selected to be compatible with the optic sensors 12 & 14.

The light source, or light emitters 18(*a–d*), may be mounted adjacent to the optic sensors 12 & 14 within the optic sensor apparatus 10. Preferably, the projected light from any light source mounted within the optic sensor apparatus assembly will be isolated, for instance by employing dividers, from the optic sensors so that the sensors do not see the transmitted light until it is reflected back. In this arrangement, the target 20 will be a reflector. Any type of reflector suitable for this purpose may be used. Preferably, the reflector will be a flat retro-reflector, or a cylindrical or spherical reflector type wherein the reflected light is sent back towards the detector in parallel to the reflector's incident light from the light source. Alternatively, the target may comprise light emitters or the light emitters may reflect onto the target from a different point other than the optic sensor apparatus assembly.

The size and power (or quantity) of the light source (or light emitters) is dependent on the application. Regardless of whether the light is reflected or projected onto the sensors, the intensity of the light at the sensors should be sufficient to provide an acceptable signal-to-noise ratio for any target position within the sensing area while not being so great as to saturate either of the sensors.

Figure 2:
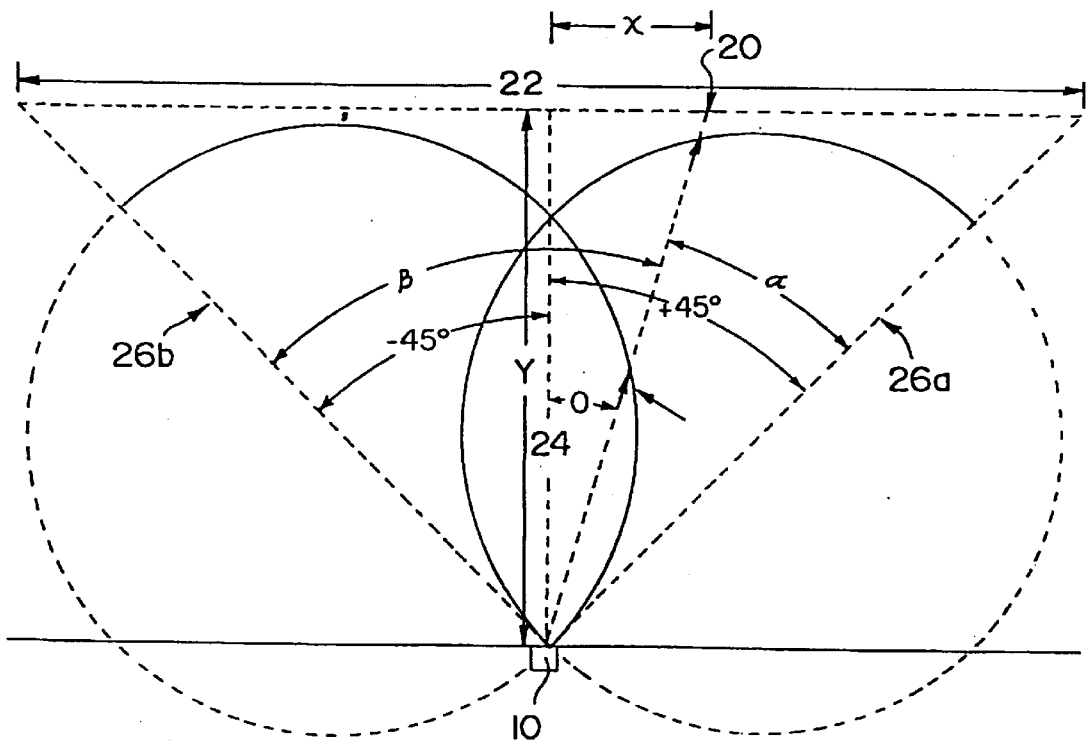
FIG. 2 is a diagram illustrative of the principle of detecting the position of the target by the sensor assembly of FIG. 1.

An apparatus comprising two optic sensors having perfectly circular shaped sensitivity curves, see FIGS. 2 & 3, provides an easy means to trigonometrically solve for the angle of the target based on the relative signals from sensors, see below. Although optic sensors having a perfectly circular shaped sensitivity curve 32 are not as common as some of the other types, a sensor having for example a cardioid shaped sensitivity curve 31 may be made to approximate a perfect circularly shaped sensitivity curve 32 with filters, lens, and/or the like. In the preferred embodiment, the optic sensors have cardioid shaped sensitivity curves 31 and are preferably mounted in a recess 28 within a mounting block 30 so that light at the extreme ends of the sensors' sensing areas is blocked from the sensor. This enables the sensitivity curves in the 180° forward viewing area to approximate a circle and thereby simplify the calculation to determine the angular position of the target from the relative signals.

With a preferred optic sensor apparatus 10 as depicted in FIG. 1 and described above, the angular position (θ) of the target relative to the centerline 24, or zero degree, of the total sensing area 22 can be trigonometrically calculated, see FIG. 2. A target 20 in the apparatus' total sensing area 22, or active area, reflects a certain intensity of light *l* back onto the apparatus 10. The intensity A and B of the light on the respective optic sensors 12 & 14, within the apparatus, generates a signal with a magnitude corresponding to the offset angle (α and β, respectively) the target 20 makes with the particular centerline 26 (*a* & *b*) of each of the optic sensors. The output signals of the two optic sensors can be mathematically expressed as follows:

Magnitude of signal "A": $A = l \cdot COS(\alpha)$

Magnitude of signal "B": $B = l \cdot COS(\beta)$

Where:

$\alpha = 45 - \theta$ and $\beta = 45 + \theta$

Then:

$A = l \cdot COS(45-\theta)$ and $B = l \cdot COS(45+\theta)$

Now from the "Cosine sum of angles" law:

$A = l \cdot COS(45-\theta) = l \cdot COS(45) \cdot COS(\theta) + l \cdot SIN(45) \cdot SIN(\theta)$ $B = l \cdot COS(45+\theta) = l \cdot COS(45) \cdot COS(\theta) - l \cdot SIN(45) \cdot SIN(\theta)$ By dividing the difference of "A" and "B" by the sum of "A" and "B" the angle "Theta (θ)" can be found in terms of its tangent as follows:

$A - B = l \cdot COS(45) \cdot COS(\theta) + l \cdot SIN(45) \cdot SIN(\theta) - (l \cdot COS(45) \cdot COS(\theta) - l \cdot SIN(45) \cdot SIN(\theta))$ $A + B = l \cdot COS(45) \cdot COS(\theta) + l \cdot SIN(45) \cdot SIN(\theta) + (l \cdot COS(45) \cdot COS(\theta) - l \cdot SIN(45) \cdot SIN(\theta))$ $(A-B)/(A+B) = (2 \cdot l \cdot SIN(45) \cdot SIN(\theta))/(2 \cdot l \cdot COS(45) \cdot COS(\theta))$ Since $SIN(45) = COS(45) = 1/\sqrt{2}$:

$(A-B)/(A+B) = SIN(\theta)/COS(\theta) = TAN(\theta)$

OR $(\theta) = ARCTAN(A-B)/(A+B)$

Once the tangent of Theta is found, the lateral offset distance "±X" from the centerline of the apparatus' total sensing area can be solved for in dimensional terms of "Y", the distance to the target's path from the optic sensor (see FIG. 2), as follows:

$X = Y \cdot TAN(\theta)$ where: $TAN(\theta) = X/Y$

For optic sensors having different sensitivity curves, the angular position and offset distance may be similarly determined and solved for by using a suitable function for the respective curves of the optic sensors. The angular position of the target may be determined from the relative signals from the optic sensor with any other suitable method including an empirically derived truth table.

There are a variety of uses for an optic sensor of the present invention. For instance, the optic sensor could be positioned on a traditional driverless vehicle to enable the driverless vehicle to track a target attached to an overhead conveyor in which it traverses a horizontal and linear course. As the target moves, the optic sensor will sense the movement and generate a signal corresponding to the offset angle between the centerline of the optic sensor and the position of the target. Since the target is traveling horizontally and linearly, the distance between the floor upon which the driverless vehicle travels, and hence the optic sensor, and the target is fixed. Therefore, once the angular offset position of the target is determined the absolute offset distance can be solved for and the driverless vehicle moved to maintain the desired, or center, position with respect to the target.

The optic sensor apparatus of the present invention utilized on a driverless vehicle in the manner described above generates signals relative to the angular offset position of a target similar to the angular offset signals generated by the sensing coils of the wire guided driverless vehicles of applicants' U.S. Pat. No. 5,434,781, which is herein incorporated by reference. Accordingly, it will be appreciated that an optic sensor of the present invention can readily be interchanged with a sensing coil apparatus to convert a wire guided driverless vehicle to an optically guided driverless vehicle.

The optic sensor assembly of the present invention may be equipped with lenses, filters or other similar devices. The apparatus in FIG. 1 depicts an infrared filter 16 which protects the sensors from dust and other physical disturbances while allowing infrared light to pass. The apparatus may also comprise a processor 8 for receiving the signals from the optic sensors and determining the angular position of a target. The processor 8 may be integral with the apparatus 10 or part of a piece of equipment, for instance a driverless vehicle, upon which the optic sensor is attached. The processor may be any type of processor suitable for this purpose including a microprocessor or a group of interconnected discrete integrated circuits.

What is claimed is:

1. An apparatus comprising:
   an optic sensor assembly having a total sensing area with a centerline comprising:
      a first optic sensor having a first sensing area;
      a second optic sensor having a second sensing area; and
      wherein said first and said second sensing areas overlap to form the total sensing area; and
   means for determining a target's angular position within said total sensing area based on the relative signals received at said first and said second sensors; wherein the centerline of said first sensing area and the centerline of said second sensing area are not parallel.

2. The apparatus of claim 1, wherein said sensors are arranged on opposite sides of said centerline of said total sensing area.

3. An apparatus comprising:
   an optic sensor assembly having a total sensing area with a centerline comprising:
      a first optic sensor having a first sensing area;
      a second optic sensor having a second sensing area: and
      wherein said first and said second sensing areas overlap to form the total sensing area and the centerline of each said first and said second sensing areas form a substantially equal angle with said centerline of said total sensing area and
   means for determining a target's angular position within said total sensing area based on the relative signals received at said first and said second sensors.

4. The apparatus of claim 1, wherein said first and said second sensors have sensing faces directed toward a line perpendicular to said centerline of said total sensing area.

5. The apparatus of claim 1, wherein said target's angular position is determined relative to said centerline of said total sensing area.

6. The apparatus of claim 1, wherein said first and said second sensors are responsive to the same type of optical signal.

7. The apparatus of claim 1, wherein said first and said second sensors have substantially identical sensitivity characteristics.

8. The apparatus of claim 1, wherein said sensor assembly further comprises at least one light emitter.

9. The apparatus of claim 4, wherein said sensor assembly further comprises at least one light source and said light source emits light toward said line perpendicular to said centerline of said total sensing area.

10. An apparatus for determining the angular offset of a target from a reference line, said reference line being fixed independently of said target, comprising:
    a first optic sensor having a first sensing area; and,
    a second optic sensor having a second sensing area;
    said first and said second sensing areas overlapping to form a total sensing area; and
    means for determining the angular position of the target with respect to said reference line based on the relative strength of signals received from the target at said first and said second sensors.

11. The apparatus of claim 10 wherein said sensors are located on opposite sides of said reference line.

12. The apparatus of claim 11 wherein said sensors are angled away from said reference line at substantially equal angles.

13. The apparatus of claim 10 wherein said reference line comprises the centerline of said total sensing area.

14. The apparatus of claim 10 including a light source for illuminating said total sensing area.

15. The apparatus of claim 14 wherein said light source is mounted on said apparatus.

16. An apparatus for determining the angular offset of a target from a reference line independently of the distance between said target and said apparatus comprising:
    a first optic sensor having a first sensing area;
    a second optic sensor having a second sensing area;
    said first and said second sensing areas overlapping to form said total sensing area; and
    means for determining the angular position of the target with respect to said reference line based on the relative strength of signals received from the target at said first and said second sensors.

17. An apparatus according to claim 16 wherein said reference line is fixed with respect to said first and second sensors.

18. An apparatus according to claim 17 wherein said first and second sensors are angled away from said reference line at substantially equal angles.

19. An apparatus according to claim 18 including a light source for illuminating said total sensing area.

20. An apparatus according to claim 19 wherein said light source is mounted on said apparatus.

* * * * *

UNITED STATES PATENT AND TRADEMARK OFFICE
CERTIFICATE OF CORRECTION

PATENT NO. : 5,825,481
DATED : October 20, 1998
INVENTOR(S) : Cornell W. Alofs & Ronald R. Drenth It is certified that error appears in the above-identified patent and that said Letters Patent is hereby corrected as shown below:

On the title page,

Item [56] insert

| Document No. | Date (D/M/Y) | Country |
|---|---|---|
| 1 574 852 | 10-05-1968 | France |
| 2 397 625 | 11-07-1977 | France |
| WO 89/04973 | 01-06-1989 | PCT |
| DE 4301477 C1 | 21-01-1993 | Germany |
| DE 3627972 A1 | 18-08-1986 | Germany |

Signed and Sealed this

Sixth Day of March, 2001

Attest:

NICHOLAS P. GODICI

Attesting Officer     Acting Director of the United States Patent and Trademark Office